United States Patent [19]

Grubbs

[11] Patent Number: 4,661,328

[45] Date of Patent: Apr. 28, 1987

[54] ALUMINA FROM HIGH SILICA BAUXITE

[75] Inventor: Donald K. Grubbs, Rector, Pa.

[73] Assignee: Aluminum Company of America, Pittsburgh, Pa.

[21] Appl. No.: 905,518

[22] Filed: Sep. 10, 1986

Related U.S. Application Data

[63] Continuation-in-part of Ser. No. 746,485, Jun. 19, 1985, abandoned.

[51] Int. Cl.$^4$ .............................................. C01F 7/06
[52] U.S. Cl. .................................... 423/121; 423/127
[58] Field of Search ...................... 423/121, 127, 131

[56] References Cited

U.S. PATENT DOCUMENTS

| | | |
|---|---|---|
| 2,375,342 | 5/1945 | Brown ................................ 423/121 |
| 2,375,343 | 5/1945 | Brown ................................ 423/121 |
| 3,401,009 | 9/1968 | Gittos ................................. 423/121 |
| 3,413,087 | 11/1968 | Roberts ............................. 423/121 |
| 3,668,442 | 2/1972 | Fish ................................... 423/121 |
| 3,681,013 | 8/1972 | Fish ................................... 423/121 |
| 3,716,617 | 2/1973 | Oku et al. .......................... 423/121 |
| 4,468,375 | 8/1984 | Misra ................................. 423/122 |

OTHER PUBLICATIONS

Chemical Engineering, Oct. 2, 1961, pp. 42–44.
Glastonbury, "Advances Extr. Met. Proc. Symp.", London 1967, Kinetics of Gibbsite Extraction, pp. 908–917.

*Primary Examiner*—H. T. Carter
*Attorney, Agent, or Firm*—Douglas G. Glantz

[57] ABSTRACT

A process is disclosed for purifying gibbsitic alumina-rich ore of high silica content including admixing the ore with an aqueous digestion solution high in silica concentration. In one aspect the digestion is performed with high alumina and soda concentration at low temperature, e.g., such as by atmospheric digestion.

18 Claims, No Drawings

ALUMINA FROM HIGH SILICA BAUXITE

CROSS-REFERENCE TO RELATED PATENT APPLICATION

This application is a continuation-in-part application of U.S. Pat. Ser. No. 746,485, filed June 19, 1985.

BACKGROUND OF THE INVENTION

This invention relates to a process for recovering alumina from high silica bauxite.

The Bayer process is the predominant conventional refining process for recovering alumina from alumina-bearing ore. The Bayer process involves digesting an alumina-bearing ore, such as bauxite, in caustic liquor under pressure to form an alumina-rich solution. The solution then is separated from digestion residue, commonly called red mud, consisting of undissolved portions of bauxite as well as insolubles formed during digestion. The red mud typically is discarded as waste. Supersaturated alumina solution then is seeded with alumina and agitated to precipitate aluminum hydrate from the supersaturated liquor. Spent liquor is returned to the pressure digestion where its caustic values are used to treat more bauxite. Most of the high-purity alumina used in the electrolytic production of aluminum today is produced in this Bayer process by either low temperature digestion to extract gibbsite or under higher temperature to extract both gibbsite and boehmite.

Commercial operation of the Bayer process is confined to the treatment of bauxite containing less than about 6% reactive silica by weight. High silica bauxite, i.e., bauxite containing more than about 5% reactive silica by weight, cannot be treated economically by the Bayer process because of high soda losses. The higher reactive silica content raises the cost and decreases the efficiency of the process. Reactive silica in the bauxite affects the economics of the Bayer process. Reactive silica, e.g., present in the bauxite ore as kaolinite, causes soda losses in the Bayer process by the formation of a soda-silica-alumina desilication product. Soda costs attributable to desilication product are proportional to the reactive silica in the bauxite processed.

Various processes have been proposed for the commercial extraction of alumina from high silica, alumina-bearing ores. Brown in U.S. Pat. Nos. 2,375,342 and 2,375,343 proposed a sinter method for recovering alumina from low-grade ores by treating the low-grade ore to solubilize its alumina and to separate dissolved alumina from silica and other unwanted impurities in the ore. Alkaline earth and alkali metal compounds are mixed with ore and then sintered. The function of the alkaline earth compound is to insolubilize silica. Any compound which forms insoluble silicates could be used in the Brown process, but readily available and low-cost limestone is preferred. The amount of limestone to be added depends on the amount of silica in the ore. The sintered mixture is then leached to recover soluble alumina and caustic values. The leach liquor will also contain quantities of solubilized impurities, principally silica. The leaching media may be heated, preferably to temperatures not in excess of 200° F., higher temperatures promoting the formation of insoluble complexes containing alumina. The residue of alkaline earth silicate and insoluble impurities (plus insoluble alumina) is discarded. Leach liquor containing substantial amounts of soluble silica is added to a bauxite-caustic liquor and digested in a conventional Bayer process.

Misra, U.S. Pat. No. 4,468,375, discloses that caustic soda reacts with silica minerals present in bauxite, and terms this a "chemical caustic loss" dependent upon the amount of caustic and reactive silica minerals present in the bauxite. Misra notes that the Bayer process alumina product generally contains various inorganic impurities such as silica, and the process efficiency is lowered by such impurities which accumulate in the caustic liquor as it recirculates through the initial step of bauxite digestion in the Bayer process. Misra proposed a process including comminuting aluminum-containing mineral ore; reacting the comminuted ore at an elevated temperature with an aqueous solution of at least 150 g/L of sodium bicarbonate to form a solid reaction product of dawsonite and impurities; and converting the dawsonite to alumina. In this way, an aqueous solution of sodium bicarbonate replaces aqueous sodium hydroxide in the initial bauxite digestion.

Oku et al., U.S. Pat. No. 3,716,617, discloses a process for producing alumina according to the Bayer process and separating digestion residue from sodium aluminate slurry. Although ambiguous, Oku refers to a "reactive silica" as silica present as clay and/or any other silicate in an alumina-containing ore. Oku discloses that when the temperature during extraction of an alumina component from bauxite is high, digestion time required may be short but, on the other hand, the rate of dissolution of the reactive silica becomes greater, so the rate of variation of the reactive silica content in the digestion residue becomes quick and the operation becomes difficult. Further, the desilication reaction is accelerated and the alumina and alkali solution are lost. On the other hand, if the digestion temperature is low, the desired high alumina concentration in the sodium aluminate solution cannot be obtained. Therefore, the digestion temperature is usually 90° C. to 150° C., preferably 110° C. to 140° C. The Oku process mixes bauxite containing over about 10% by weight total silica, 8.5% by weight reactive silica, with sodium aluminate solution which apparently is silica-free. The digestion residue is separated from the sodium aluminate solution by a synthetic organic high molecular weight flocculent, the separation being conducted only when at least 5% by weight reactive silica remains in the digestion residue. Soda concentrations higher than 70 g/L are disclosed for digestion.

Roberts, U.S. Pat. No. 3,413,087, discloses extracting alumina from bauxite by digestion in a caustic alkali solution in which the silica content is insolubilized. The Roberts process predigests all the bauxite in a caustic alkali solution insufficient to dissolve all the soluble alumina in the bauxite but sufficient to dissolve substantially all the silica in the bauxite at an elevated temperature and for a time sufficient to permit desilication of the liquor by precipitation of the silica in the form of insoluble complex sodium aluminum silicate. By maintaining the slurry in the predigestion stage at a temperature above about 150° F., crystallization and precipitation of the silica form complex sodium aluminum silicate as desilication product. The crystals of desilication product act as a seed for promoting nucleation and precipitation of additional amounts of desilication product on previously formed crystal surfaces, in preference to deposition on heat exchange surfaces to improve heat exchange rates in the process.

The first output of alumina from Africa is described in *Chemical Engineering*, Oct. 2, 1961. Alumina is produced from low-silica bauxite at Fria, Guinea, by atmospheric digestion at about 220° F. by digestion of the ore in a sodium aluminate liquor (200 g/L Na₂O).

Fish, U.S. Pat. No. 3,681,013, discloses a process for eliminating the erosion normally encountered during high pressure digestion of bauxite containing considerable amounts of non-reactive silica, e.g., such as quartz sand. The Fish process separates a coarse fraction from fines and digests the fines in a conventional pressurized digestion.

It is an object of the present invention to produce purified alumina from alumina-rich gibbsitic ore containing high amounts of reactive silica.

It is another object of the present invention to provide for the digestion of alumina from low-grade bauxite ores while inhibiting the dissolution of reactive silica from kaolinite in a sodium aluminate solution.

It is yet another object of the present invention to purify alumina-rich ore containing high amounts of reactive silica while minimizing the loss of soda in the form of desilication product.

These and other objects will become apparent from the disclosure which continues as follows.

SUMMARY OF THE INVENTION

In accordance with the present invention, a process is provided for purifying an alumina-rich ore containing more than about 5% reactive silica by weight including admixing the ore with an aqueous digestion solution of silica and sodium aluminate and digesting the mixture at a temperature in the range of about 80° C. to about 150° C. to dissolve alumina while inhibiting the dissolution of reactive silica from the ore. The process includes using soda values of more than about 240 g/L total caustic on a sodium carbonate basis. In one aspect, the process of the present invention includes a continuous process for producing alumina from high silica bauxite including admixing the bauxite with an aqueous digestion solution nearly saturated with silica and nearly saturated with alumina.

DETAILED DESCRIPTION

The process of the present invention reduces the amount of silica dissolution from high silica bauxite such as gibbsitic bauxite containing kaolinite. Alumina could be produced in the present process from high silica Arkansas bauxite at costs competitive with domestic alumina production from imported high-purity alumina-rich bauxite by reducing the amount of reactive silica.

In conventional processes, the precipitation of silica, soda, and alumina in desilication product irreversibly fixes soda in the residue and is responsible for fixed soda losses. The process of the present invention converts a high reactive silica bauxite to a low reactive silica bauxite and reduces the amount of fixed soda losses by digestion at lower temperatures and shorter contact times than the conventional low temperature Bayer process which uses a temperature of about 143° C. and a residence time of one-half hour which is necessary to desilicate the digest liquor.

The present process requires admixing the high silica ore with an aqueous digestion solution of high alumina, high silica, and high soda in solution. Silica is present in the digestion solution at a concentration over about 1.8 g/L. Typically, silica can be present in the digestion solution at concentrations in the range of about 1.8 g/L to 2.5 g/L. In one aspect, a feed solution having low silica concentration is fed to a back-mixed reactor which raises the concentration of silica and alumina to slightly below saturation. For example, the digestion solution contains silica in an amount of about 2.0 g/L. The digestion solution also contains high amounts of alumina. By high amounts of alumina in the solution is meant that the digestion solution will be saturated when the Al₂O₃ is extracted from the bauxite charged. Typically, high amounts of alumina can be alumina concentrations in the range of about 150 g/L to 170 g/L. The feed solution for digestion also contains high soda values, preferably above about 240 g/L on a sodium carbonate basis. The soda value typically will be in the range of about 240 g/L to 300 g/L (sodium carbonate basis).

The present process conducts an alumina digestion step in a back-mixed reactor at temperatures lower than conventional Bayer process temperatures. The present process requires digestion temperatures in the range of about 80° C.–150° C., preferably in the range of about 90° C.–130° C., more preferably in the range of about 100° C.–120° C. The process can be carried out at atmospheric pressure and the attendant temperature at which the digestion slurry boils. In a narrower temperature range, the process can be carried out at a temperature in the range of about 104° C.–111° C. in high caustic digestion liquors.

In one aspect, the process of the present invention is carried out as a continuous process by admixing a digestion feed of low-grade ore of gibbsitic alumina and high reactive silica content (kaolinite) and with a continuous aqueous solution nearly saturated with silica and alumina, and also high in soda content. The unique nature of the digestion process retards the dissolution of silica into the solution and prevents the precipitation of desilication product, thereby reducing soda losses as desilication product.

In comparison to processing high reactive silica bauxite at 143° C. for one-half hour, digestion in the process of the present invention reduces fixed soda loss by about 80%.

It has been found that silica dissolution from kaolinite is directly related to digestion temperature, bauxiteresidue contact time, and the amount of desilication product seed in the digestion slurry. Silica dissolution from kaolinite under continuous, back-mixed atmospheric digestion conditions is inversely related to the concentration of silica in the digest liquor and the total caustic in solution.

It further has been found that alumina digestion yield can be increased, e.g., to greater than about 50 g/L by atmospheric digestion in high caustic, e.g., more than about 240 g/L total caustic, without increasing the total silica dissolution.

Fixed soda losses in atmospheric digestion overflow slurries have been reduced to less than 0.05 tons of sodium hydroxide per ton of alumina for 34% available Al₂O₃ bauxite. The soda loss with prior art processing (143° C., 0.5 hr) was 0.238 tons of sodium hydroxide per ton of alumina for this bauxite.

While the invention has been described in terms of preferred embodiments, the claims appended hereto are intended to encompass all embodiments which fall within the spirit of the invention.

What is claimed is:

1. In a process for purifying gibbsitic alumina-rich ore of reactive silica content over about 5% by weight including digesting the ore in a sodium aluminate solution, the improvement for extraction of the alumina while inhibiting the dissolution of reactive silica comprising:
- admixing said ore with an aqueous digestion solution nearly saturated with silica at a concentration of about 1.8 g/L to 2.5 g/L, alumina at a concentration of about 150 g/L to 170 g/L to be slightly below saturation for a given soda concentration, and soda at a concentration of about 240 g/L to 300 g/L in a back-mixed reactor;
- digesting alumina from said ore to form an alumina-saturated digest solution;
- adding desilication product seed to form a desilicated liquor;
- removing digest residue; and precipitating alumina from the desilicated digest solution.

2. A process as set forth in claim 1 wherein said high silica content can comprise more than about 6% reactive silica by weight.

3. A process as set forth in claim 2 further comprising digesting at a temperature in the range of about 80° C. to about 150° C.

4. A process as set forth in claim 3 wherein said soda concentration comprises a high total caustic content in an amount ranging from about 240 g/L to 300 g/L total caustic on a sodium carbonate basis.

5. A process as set forth in claim 4 wherein said temperature falls in the range of about 90° C.–130° C.

6. A process as set forth in claim 5 wherein said digesting takes place in a period of about 0.16 hr. to 0.33 hr.

7. A process as set forth in claim 6 wherein said temperature falls in the range of about 100° C.–120° C.

8. A process as set forth in claim 7 wherein said temperature falls in the range of about 104° C.–111° C.

9. A process as set forth in claim 8 carried out as a continuous process in a back mixed digestion vessel.

10. A process for purifying an alumina-rich ore containing more than about 5% reactive silica by weight comprising:
- admixing said ore with an aqueous digestion solution nearly saturated with silica and sodium aluminate for any given high total caustic at concentrations in the range of about 1.8 g/L to 2.5 g/L $SiO_2$, 150 g/L to 170 g/L $Al_2O_3$ and 240 g/L to 300 g/L total caustic; and
- digesting the mixture to dissolve alumina from gibbsite concentration while inhibiting the dissolution of reactive silica from said ore.

11. A process as set forth in claim 10 wherein said digesting takes place at a temperature in the range of about 80° C.–150° C.

12. A process as set forth in claim 11 wherein said temperature falls in the range of about 90° C.–130° C.

13. A process as set forth in claim 12 wherein said temperature falls in the range of about 100° C.–120° C.

14. A process as set forth in claim 13 wherein said temperature falls in the range of about 104° C.–111° C.

15. A process as set forth in claim 14 wherein said silica in the feed solution is slightly below saturation for a given caustic concentration.

16. A process as set forth in claim 15 further comprising removing dissolved silica by seeding with desilication product.

17. A process as set forth in claim 16 wherein said ore comprises gibbsitic ore containing reactive silica as kaolinite and said removing dissolved silica by seeding with desilication product and desilication are carried out with the time needed being inversely proportional to the amount of desilication product added to the liquor.

18. A continuous process for purifying an alumina-rich ore containing more than about 5% reactive silica by weight comprising:
- admixing said ore with an aqueous sodium aluminate digestion solution containing silica at a concentration of about 1.8 g/L to 2.5 g/L and containing alumina at a concentration slightly below saturation for a given digestion temperature and soda at a concentration of about 240 g/L to 300 g/L;
- digesting the mixture at a temperature in the range of about 100° C.–120° C. for 0.17 to 0.33 hr. to dissolve alumina while inhibiting the dissolution of reactive silica from said ore; and
- removing digest residue from digest solution by clarification.

* * * * *